United States Patent
Hanov

(10) Patent No.: US 7,639,645 B2
(45) Date of Patent: Dec. 29, 2009

(54) METHOD FOR RECEIVING AND MANAGING A DOWNLINK RADIO LINK CONTROL DATA BLOCK IN AN EGPRS MOBILE ELECTRONIC COMMUNICATION DEVICE

(75) Inventor: Steve Hanov, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 512 days.

(21) Appl. No.: 11/489,669

(22) Filed: Jul. 20, 2006

(65) Prior Publication Data
US 2007/0097913 A1  May 3, 2007

Related U.S. Application Data

(60) Provisional application No. 60/731,863, filed on Nov. 1, 2005.

(51) Int. Cl.
*H04W 4/00* (2009.01)
(52) U.S. Cl. .................................... 370/329
(58) Field of Classification Search ................ 370/230, 370/235, 469, 470
See application file for complete search history.

(56) References Cited

U.S. PATENT DOCUMENTS

| | | | |
|---|---|---|---|
| 5,150,368 A * | 9/1992 | Autruong et al. ............ 714/747 |
| 5,615,255 A * | 3/1997 | Lemieux .................... 379/230 |
| 6,895,057 B1 | 5/2005 | Balachandran et al. |
| 6,937,564 B2 | 8/2005 | Anttila |
| 6,961,326 B1 * | 11/2005 | Chang et al. ................ 370/338 |
| 7,197,024 B2 * | 3/2007 | Huo ........................... 370/338 |
| 2004/0160937 A1 * | 8/2004 | Jiang .......................... 370/349 |
| 2004/0240423 A1 | 12/2004 | Anttila |

FOREIGN PATENT DOCUMENTS

| EP | 1276282 A | 1/2003 |
|---|---|---|
| EP | 1361707 A | 11/2003 |
| WO | WO 2004-091130 A1 | 10/2004 |

OTHER PUBLICATIONS

"Universal Mobile Telecommunications System (UMTS); Radio Link Control (RLC) protocol specification (3GPP TS 25.322 version 6.5.0 Release 6); ETSI TS 125 322" ETSI Standards, LIS, Sophia Antipolis Cedex, France. vol. 3-R2, No. V6.5.0, Sep. 1, 2005, XP014031933.

Application No. EP 06 75 1155 European Search Report dated Jan. 28, 2009.

* cited by examiner

*Primary Examiner*—Derrick W Ferris
*Assistant Examiner*—Mohammad Anwar
(74) *Attorney, Agent, or Firm*—Perry + Currier Inc.

(57) ABSTRACT

In a mobile electronic communication device for receiving a downlink radio link control (RLC) data block, the improvement comprising determining whether an Extension (E) bit within a header of the data block has been reset to zero, thereby denoting the existence of extension octets within the data block, summing the lengths of the extension octets, calculating the number of bytes in the data block, and discarding the data block in the event the sum of the lengths is greater than the number of bytes in the data block.

3 Claims, 5 Drawing Sheets

METHOD FOR RECEIVING AND MANAGING A DOWNLINK RADIO LINK CONTROL DATA BLOCK IN AN EGPRS MOBILE ELECTRONIC COMMUNICATION DEVICE

FIELD

The present specification relates to a mobile communication system, and more particularly to a method for receiving and managing a downlink radio link control (RLC) data block in an Enhanced General Packet Radio System (EGPRS) mobile electronic communication device.

BACKGROUND

Global System for Mobile Communications (GSM) is the dominant world standard for 3G wireless voice and data communications. In a typical GSM communication system, speech and/or data is encoded at the source and transmitted over a network to a receiver. Upon receipt of the transmitted data, the receiver performs channel equalization and decoding to return the speech and/or data to a recognizable form for delivery to the user. GSM/EDGE (Enhanced Data rates for Global Evolution) represents the latest stage in the evolution of the GSM standard. EDGE uses a modulation schema to enable theoretical data speeds of up to 384 kbit/s within the existing GSM spectrum.

The General Packet Radio System (GPRS) was developed as a packet data network for the GSM standard. A GSM cellular phone uses Gaussian Minimum Shift Keying (GMSK) for modulation at the Physical Layer. The GSM specification has gone through several revisions, each adding enhancements to the network. One such revision of the specification is Enhanced GPRS or EGPRS, which provides higher data rates through the use of 8PSK modulation and GMSK on the Physical Layer, in addition to performance improvements in the Radio Link Control (RLC) and Media Access Control (MAC) sublayers through the use of adaptive coding and incremental redundancy. These changes in the Physical Layer are essential to the EDGE component of the modern GSM/EDGE Network.

In EGPRS, the RLC/MAC layers on either side of the network are situated at the mobile electronic communication device, or Mobile Station (MS), and the Base Station Subsystem (BSS). The peer RLC/MAC entities communicate using Radio Blocks of one or more RLC/MAC Protocol Data Units (PDU). Each PDU is numbered using a Block Sequence Number (BSN). In acknowledge mode, the BSNs are tracked by the sending and receiving RLC/MAC entities to allow for erroneous blocks to be corrected by sending additional and incremental information to aid decoding. For downlink (BSS to MS) status, the BSS polls the MS to request the status of received blocks, and the MS replies with a status report (the PACKET DOWNLINK ACK/NACK) within a required period of time. For uplink (MS to BSS) status, the BSS periodically sends a status report (PACKET UPLINK ACK/NACK) to each communicating MS.

Procedures used at the radio interface for the GPRS Medium Access Control/Radio Link Control (MAC/RLC) layer are set forth in the 3rd Generation Partnership Project; Technical Specification Group Digital Cellular Telecommunications System (Phase 2+); General Packet Radio Service (GPRS); Mobile Station (MS)-Base Station System (BSS) interface; Radio Link Control/Medium Access Control (RLC/MAC) protocol 3GPP TS 04.60 V8.27.0, September 2005.

The RLC function defines the procedures for segmentation and reassembly of Logical Link Control (LLC) PDUs into RLC/MAC blocks, as well as link adaptation. Different RLC/MAC block structures are defined for data transfers and control message transfers. The RLC/MAC block structures for data transfers are different for GPRS and EGPRS, whereas the same RLC/MAC block structure is used for control message transfers. The EGPRS downlink RLC data block includes one or more extension (E) bits for indicating the presence of optional extension octets in the RLC data block. Although the E bit is considered to be a header field, it is transmitted in the data portion of the block. When the E bit is reset to 0, then an optional extension octet follows immediately thereafter, where the extension octet comprises a 7-bit length indicator (LI) for indicating the length (i.e. number of octets) of the LLC PDU, and a further E bit to indicate any further extension octets. If the E bit is set to 1 then no extension octet follows and the LLC PDUs follow immediately. Thus, when the E bit of the data block is set to 1, this indicates that an LLC frame ends in the current RLC data block. The RLC/MAC component within the Mobile Station (MS) then passes the data to upper layers, which perform their own error checking.

During downlink transmission of EDGE data blocks, the Mobile Station (MS) will sometimes decode the data block incorrectly, yet the CRC check will pass. For example, if the E bit is incorrectly reset to 0 as a result of packet corruption, the RLC data block will be misinterpreted as length indicators (LI) of the LLC data frames remaining in that RLC data block. This causes the LLC data frame to end prematurely. Ultimately, this error is detected within the LLC layer, and the entire IP packet is discarded and re-requested from the Base Station (BS), contributing to delay and reduced data throughput.

BRIEF DESCRIPTION OF THE DRAWINGS

The specification will be better understood with reference to the following Figures in which like numerals denote like parts and in which.

DETAILED DESCRIPTION OF THE PREFERRED EMBODIMENT

In one aspect of this specification, detection of an incorrectly reset E bit is effected prior to processing the data block. As indicated above, the EGPRS protocol specifies that if the E bit has been reset to 0, then the following bytes of the RLC data block are Length Indicators (LI) representing the lengths (number of octets) of the LLC PDUs that end in that RLC data block. Therefore, if the sum of the lengths is greater than the number of bytes in the data block, the RLC data block is deemed to have been corrupted and the data block is discarded before being passed to the LLC layers, thereby overcoming the delay and reduced data throughput disadvantages discussed above.

Generally, there is set forth herein a method comprising a) receiving a data block having at least one bit for denoting presence of associated extension data and at least one value indicating length of said extension data; b) determining a logical value of said at least one bit; in the event said bit is a first logical value then c1) calculating a sum of each said value; c2) determining size of said extension data; and c3) discarding said data block in the event said sum exceeds said size and executing step a); or in the event said bit is other than said first logical value then c4) executing step a).

More particularly, there is set forth herein a method of managing a downlink radio link control (RLC) data block in an Enhanced General Packet Radio System (EGPRS) mobile electronic communication device, comprising a) receiving said downlink RLC data block; b) determining whether an Extension (E) bit within a header of said RLC data block has been reset to zero, thereby denoting the existence of extension octets within said RLC data block, each of said extension octets including a length indicator (LI) for indicating the number of octets in each of said extension octets; c) in the event said Extension (E) bit has not been reset to zero then returning to a), and otherwise d) calculating a sum of each length indicator (LI) from each of said extension octets; e) calculating the number of bytes in said RLC data block; and f) in the event said sum exceeds said number of bytes then discarding said RLC data block and otherwise returning to a).

Figure 1:
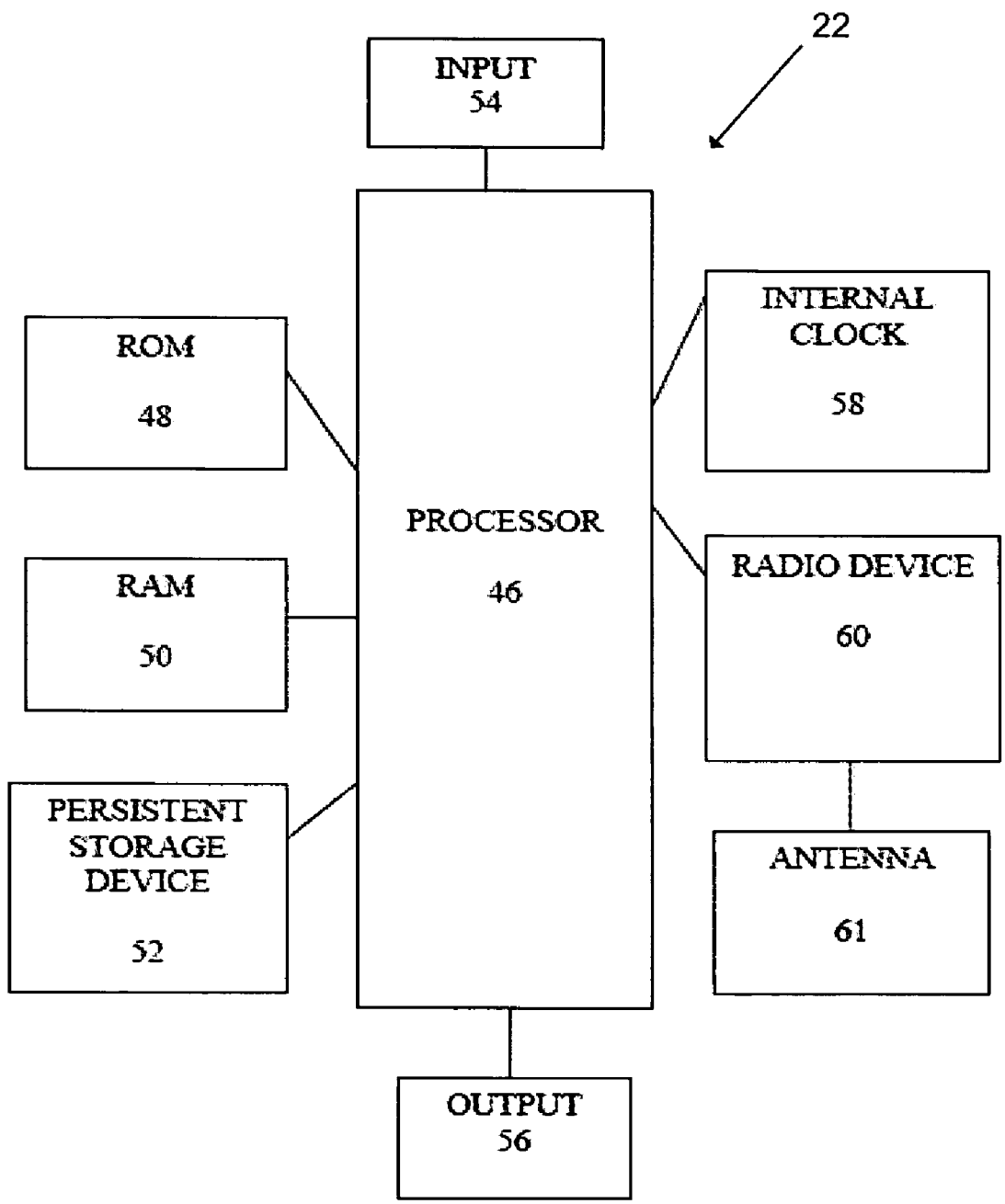
FIG. 1 is a block diagram of a mobile electronic communication device for implementing the preferred embodiment.

Referring to FIG. 1, a block diagram is provided of a mobile electronic communications device 22. The mobile electronic communications device 22 is based on a microcomputer that includes a processor 46 connected to a read-only-memory (ROM) 48 that contains a plurality of applications executable by the processor 46. The processor 46 is also connected to a random access memory unit (RAM) 50 and a persistent storage device 52 which are responsible for various non-volatile storage functions of the portable device 22. The processor 46 receives input from input devices 54 such as a keyboard. The processor 46 outputs to output devices 56 such as an LCD display. The processor 46 is also connected to an internal clock 58 and a radio device 60 which in turn is connected to an antenna 61. Together, the radio device 60 and the antenna 61 are used to communicate over a GSM radio communications channel, as discussed above. Thus, the mobile electronic communications device 22 is operable to receive and transmit communication signals containing data that is communicated to and from a remote Base Station System (BSS) via the radio device 60 and the antenna 61.

More particularly, the processor 46 includes software for implementing RLC functions such as (1) transferring LLC PDUs between the LLC layer and MAC function, (2) segmentation of LLC PDUs into RLC data blocks and re-assembly of RLC data blocks into LLC PDUs, (3) segmentation of RLC/MAC control messages into RLC/MAC control blocks and re-assembly of RLC/MAC control messages from RLC/MAC control blocks, and (4) Backward Error Correction (BEC) for enabling selective retransmission of RLC data blocks.

Figure 2:
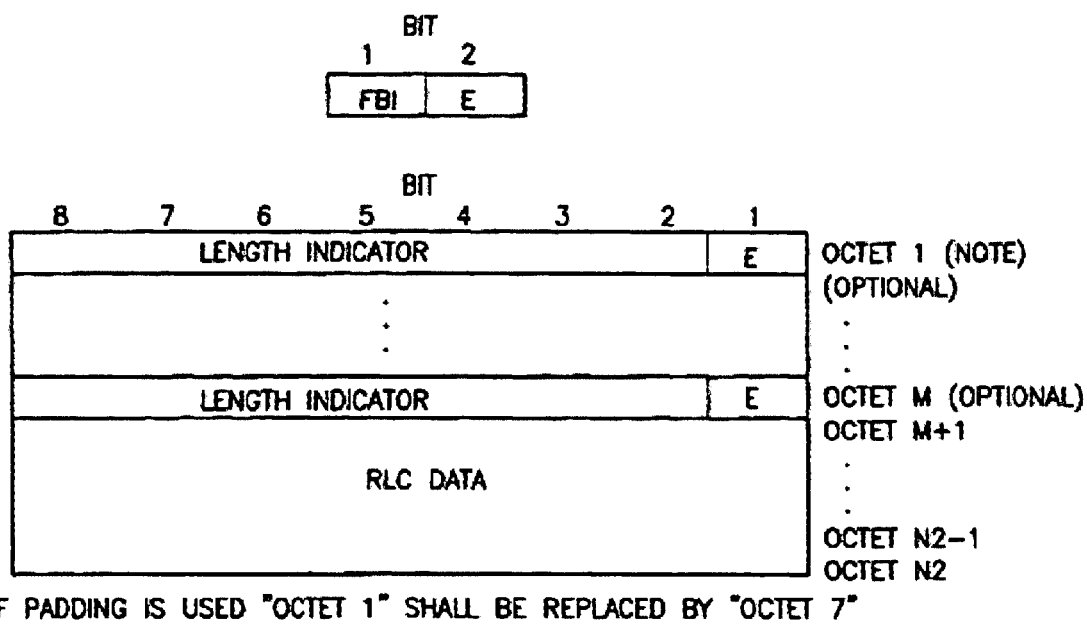
FIG. 2 is a schematic representation of a downlink EGPRS radio link control (RLC) data block.

FIG. 2 shows an EGPRS downlink RLC data block with a 2-bit header containing an FBI bit and E bit. The Final Block Indicator (FBI) bit is used to indicate whether the current downlink RLC data block is the last RLC data block of the downlink Temporary Block Flow (TBF). If FBI=0, then the current block is not the last RLC data block in TBF, whereas if FBI=1 then the current block is the last RLC data block in TBF.

Figure 3A:
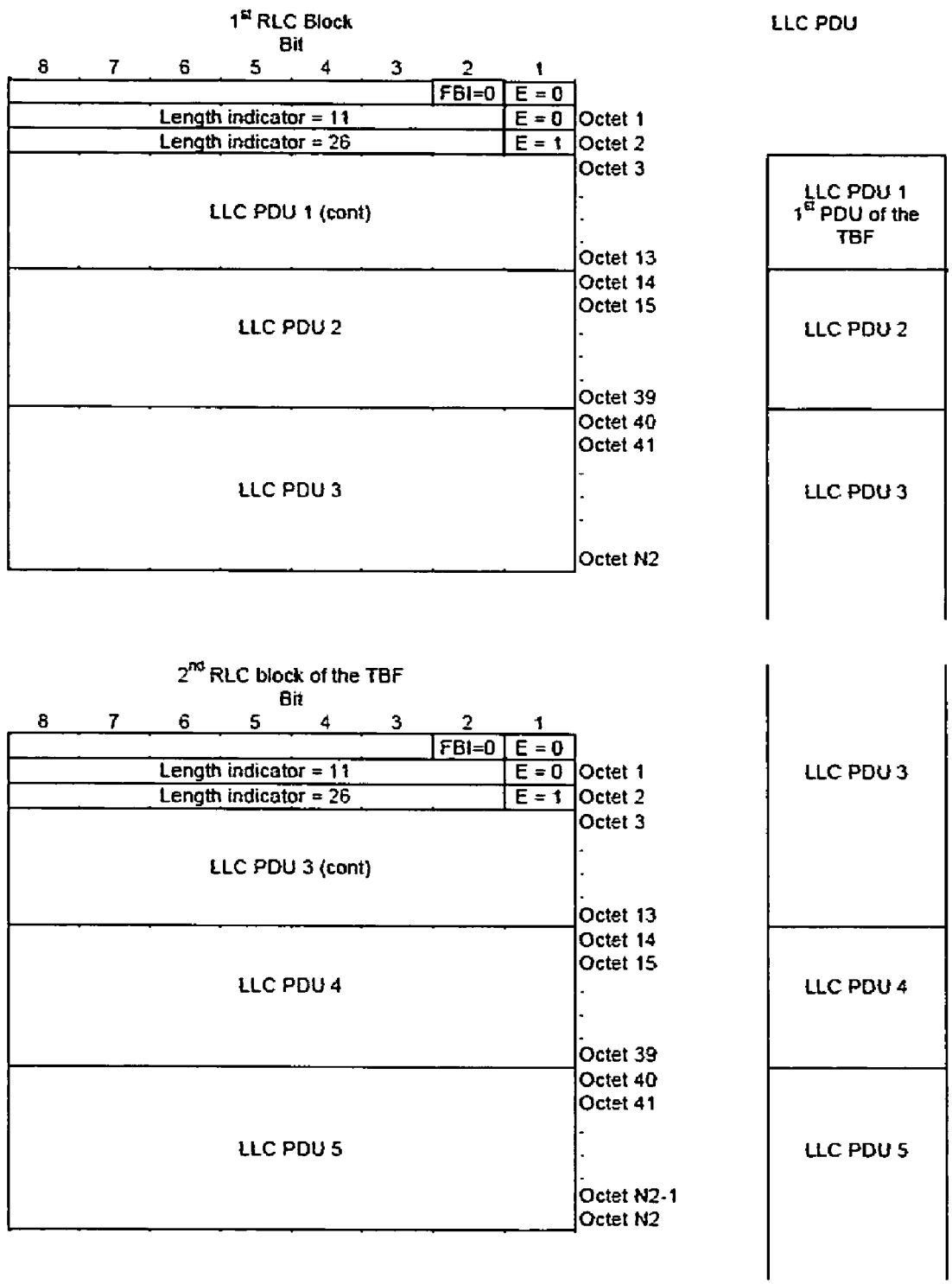
FIGS. 3A-3C show examples of various different RLC data blocks.
Figure 3B:
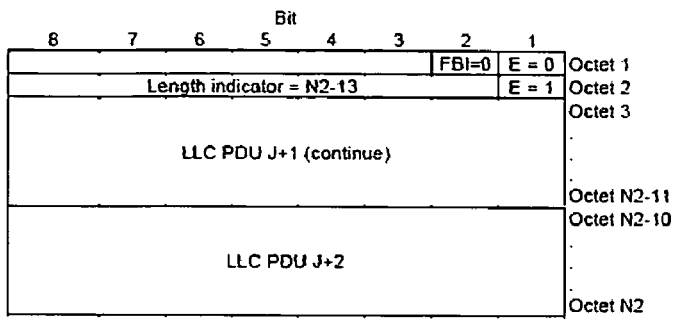
Figure 3B:
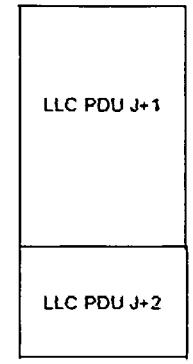
Figure 3B:
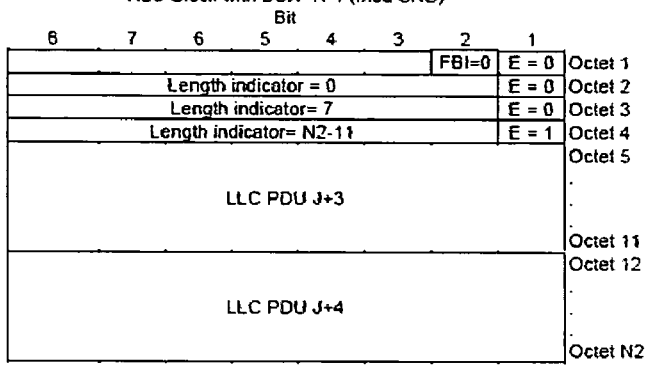
Figure 3B:
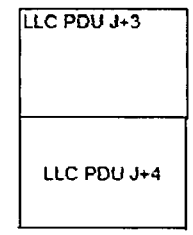
Figure 3B:
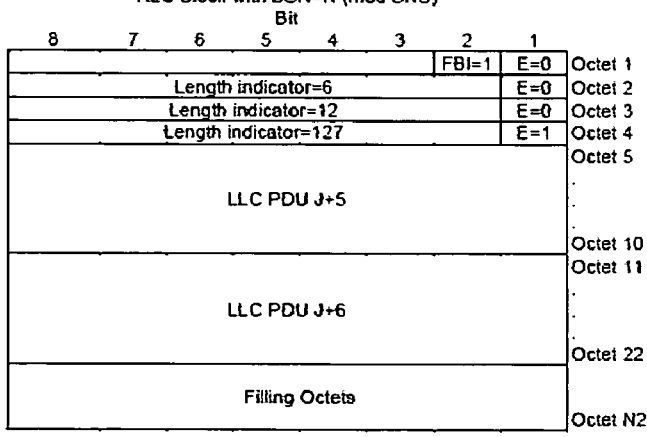
Figure 3B:
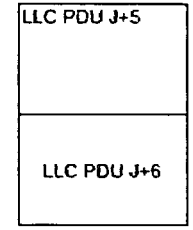
Figure 3C:
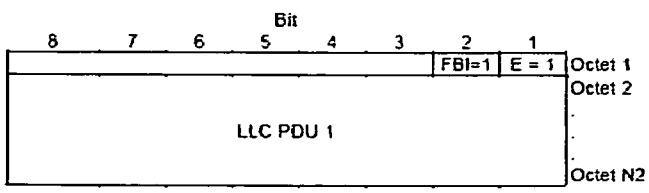
Figure 3C:
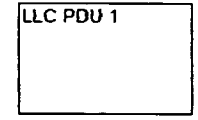

As discussed above, the E bit is used to indicate the presence of optional octets in the RLC data block header, such as in the examples of RLC data block delimitation in EGPRS shown in FIGS. 3A-3C. According to the example of FIG. 3A, the first two RLC blocks of a TBF (downlink) depict the case where LLC PDUs (LLC PDU 3 and LLC PDU 5) stretch over two consecutive RLC data blocks. It will be noted that only the last segment of the LLC PDU requires a length indicator (LI). In FIG. 3B, the LLC PDU exactly fills the RLC data block (LLC PDU J+2 and LLC PDU J+4) but the last LLC PDU cannot fill the last RLC data block (LLC PDU J+6). In the case where the LLC PDU exactly fills the RLC data block such that adding an LI for it would push the LLC PDU into the next in-sequence RLC data block, then the LLC PDU is presented in the RLC data block without a corresponding LI. If this LLC PDU is not the last of the TBF, its delimitation is indicated by the first length indicator (LI) of the next RLC data block with the value LI=0. In the case where the LLC PDU (or the last segment of it) does not completely fill the RLC data block, a length indicator of LI=127 is added to the last LI of the RLC data block. In FIG. 3C, the LLC PDU precisely fills the RLC data block, and both FBI=1 and E=1.

Figure 4:
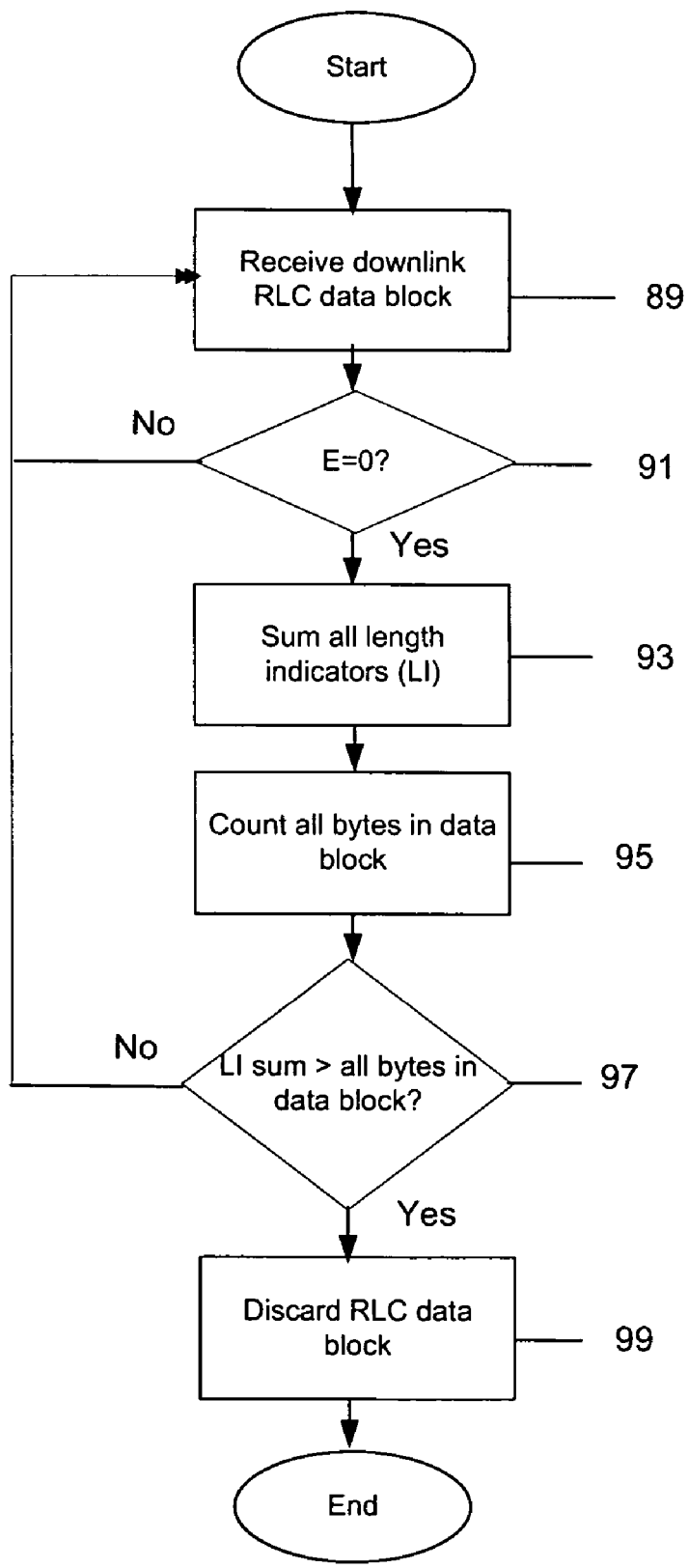
FIG. 4 is a flowchart showing the method for receiving and managing a downlink RLC data block as in FIG. 2 within the mobile electronic communication device of FIG. 1.

Turning now to FIG. 4, the method of the preferred embodiment is shown for receiving a downlink RLC data block (step 89), determining whether the Extension (E) bit has been reset (step 91), and if yes (E=0) then summing the lengths of the extension octets (step 93) and calculating the number of bytes in the data block (step 95). The number of bytes in the data block is the number of whole bytes minus the number of length indicators. If the sum of the length indicators (LI) is greater than the number of bytes in the data block (step 97) then the RLC data block is discarded (step 99).

A specific embodiment has been shown and described herein. However, modifications and variations may occur to those skilled in the art. All such modifications and variations are believed to be within the sphere and scope of the present embodiment.

What is claimed is:

1. A processor implemented method comprising:
   a) receiving a radio link control (RLC) data block having at least one Extension (E) bit for indicating the presence of one or more optional extension octets in the RLC data block, wherein each extension octet comprises a 7-bit length indicator (LI) for indicating the length of a Logical Link Control Protocol Data Unit (LLC PDU) that ends in that RLC data block, and a further Extension (E) bit to indicate any further optional extension octets;
   b) determining a logical value of said at least one Extension (E); in the event said bit is a first logical value then
   c1) calculating a sum of said length indicators (LIs) in said RLC data block;
   c2) calculating a number of bytes in said RLC data block wherein the number of bytes in the RLC data block is the number of whole bytes minus the number of length indicators (LIs); and
   c3) discarding said RLC data block in the event said sum exceeds said number of bytes in said RLC data block and in response executing step a); or
   in the event said bit is other than said first logical value then
   c4) executing step a).

2. A method of managing a downlink radio link control (RLC) data block in an Enhanced General Packet Radio System (EGPRS) mobile electronic communication device, comprising:
   a) receiving said downlink RLC data block;
   b) determining whether an Extension (E) bit within a header of said RLC data block has been reset to zero, thereby denoting the existence of extension octets within said RLC data block, each of said extension octets including a length indicator (LI) for indicating the length of a Logical Link Control Protocol Data Unit (LLC PDU) that ends in that RLC data block;

c) in the event said Extension (E) bit has not been reset to zero then returning to a), and otherwise d) calculating a sum of each length indicator (LI) from each of said extension octets in said RLC data block;

e) calculating the number of bytes in said RLC data block wherein the number of bytes in the RLC data block is the number of whole bytes minus the number of length indicators (LIs); and f) in the event said sum exceeds said number of bytes then discarding said RLC data block and otherwise returning to a).

3. In a mobile electronic communication device for receiving a downlink radio link control (RLC) data block, the improvement comprising:

determining whether an Extension (E) bit within a header of said RLC data block has been reset to zero, thereby denoting the existence of extension octets within said RLC data block wherein each extension octet comprises a 7-bit length indicator (LI) for indicating the length of a Logical Link Control Protocol Data Unit (LLC PDU) that ends in that PLC data block. and a further Extension (E) bit to indicate any further optional extension octets;

summing the length indicators in each of said extension octets in said RLC data block;

calculating the number of bytes in said RLC data block wherein the number of bytes in the RLC data block is the number of whole bytes minus the number of length indicators (LIs); and discarding said RLC data block in the event the sum of said lengths is greater than the calculated number of bytes in the RLC data block.

* * * * *

UNITED STATES PATENT AND TRADEMARK OFFICE
CERTIFICATE OF CORRECTION

PATENT NO.        : 7,639,645 B2
APPLICATION NO.   : 11/489669
DATED             : December 29, 2009
INVENTOR(S)       : Steve Hanov It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 674 days.

Signed and Sealed this

Ninth Day of November, 2010

David J. Kappos
*Director of the United States Patent and Trademark Office*